Sept. 23, 1952 G. W. SCHATZMAN 2,611,628
FENDER SHIELD
Filed Dec. 7, 1948 2 SHEETS—SHEET 1
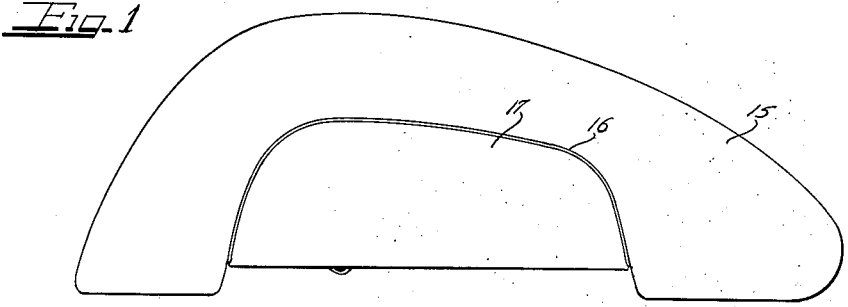
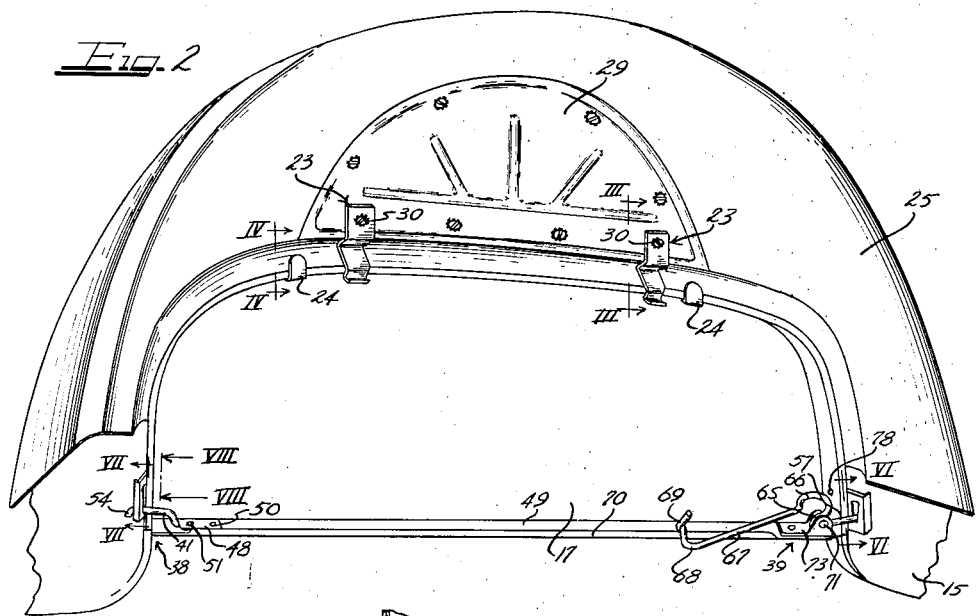
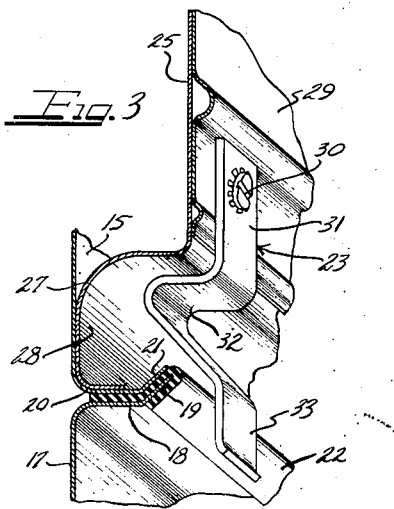
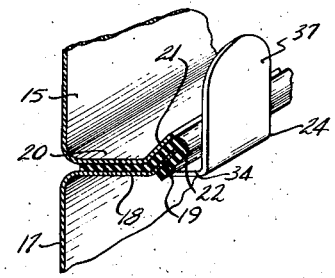
Inventor
GEORGE W. SCHATZMAN
By The Firm of Charles W. Hills Attys.

Sept. 23, 1952 G. W. SCHATZMAN 2,611,628
FENDER SHIELD
Filed Dec. 7, 1948 2 SHEETS—SHEET 2
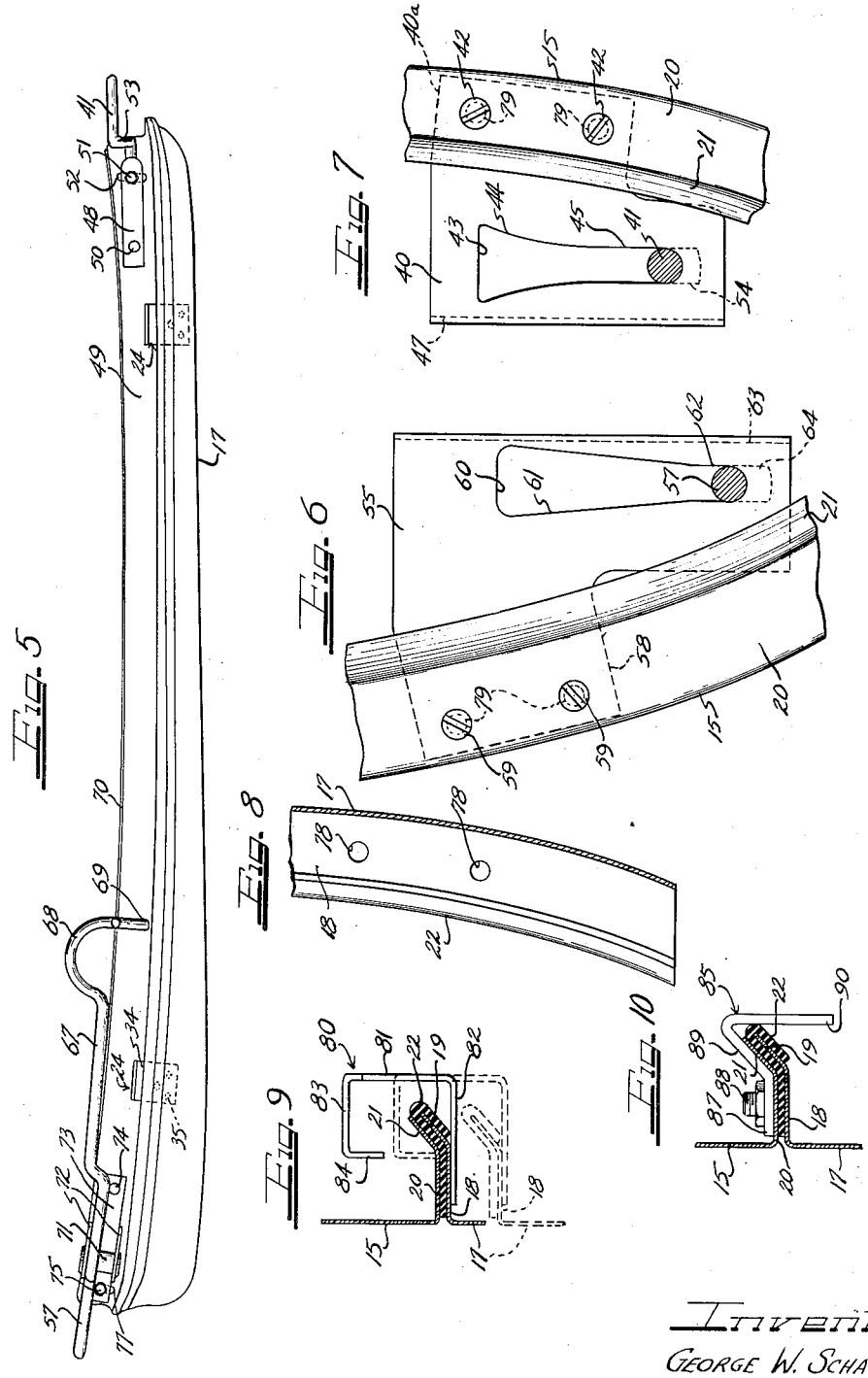
Inventor
GEORGE W. SCHATZMAN
By The Firm of Charles W. Hill Attys.

Patented Sept. 23, 1952

2,611,628

UNITED STATES PATENT OFFICE 2,611,628

FENDER SHIELD

George W. Schatzman, Detroit, Mich., assignor to Houdaille-Hershey Corporation, Detroit, Mich., a corporation of Michigan Application December 7, 1948, Serial No. 63,971

15 Claims. (Cl. 280—153)

The present invention relates to improvements in fender shields, and more particularly concerns the mounting of fender shields in closing relation to the wheel access openings of vehicle fenders.

In the vehicle industry, and particularly in the automobile branch thereof, various means have been utilized to improve the appearance of the wheel well enclosing fenders. The usual vehicle fender is provided with an opening affording access to the vehicle wheel, and permitting ready removal or replacement of the wheel in an axial direction. Since this opening inherently presents an unattractive outward appearance, and at high speed operation constitutes an air turbulence factor, detachable fender shields have been employed to cover the opening protectively and ornamentally.

As the term "fender shield" shall hereinafter be employed, it refers to any member which is adapted to be secured to a fender or other portion of a vehicle body for the purpose of covering the opening in the fender or vehicle body which is provided for access to or removal of a vehicle wheel. Furthermore, as the term "fender" shall hereinafter be employed, it refers to any form of wheel fender in its broad sense, whether such fender be separated from the vehicle body part, partly separated from the vehicle body part, or actually an integral part of the vehicle body and whether or not it projects outwardly from the principal body portion of the vehicle.

An important object of the present invention is to provide a novel fender and fender shield assembly in which the fender shield is secured to the fender in a novel manner.

Another object of the invention is to provide a fender shield having novel means for attaching the same to a fender.

A further object of the invention is to provide a novel structure for detachably securing a fender shield to a fender.

Still another object of the invention is to provide new and improved means for and method of mounting a fender shield.

Other objects, features and advantages of the invention will be readily apparent from the following detailed description of certain preferred embodiments thereof taken in conjunction with accompanying two sheets of drawings, in which:

Figure 1 is a side elevational view of a fender and fender shield assembly embodying the features of the present invention.

Figure 2 is an enlarged, fragmentary inside perspective view of the fender structure and the fender shield.

Figure 3 is an enlarged fragmentary isometric sectional view taken substantially on the line III—III of Fig. 2.

Figure 4 is an enlarged fragmentary isometric sectional view taken substantially on the line IV—IV of Fig. 2.

Figure 5 is a top plan view of the fender shield.

Figure 6 is an enlarged fragmentary sectional elevational view taken substantially on the line VI—VI of Fig. 2.

Figure 7 is an enlarged fragmentary sectional detail elevational view taken substantially on the line VII—VII of Fig. 2.

Figure 8 is an enlarged fragmentary sectional elevational view taken substantially on the line VIII—VIII of Fig. 2.

Figure 9 is a fragmentary sectional elevational view of a modified construction.

Figure 10 is a fragmentary vertical sectional elevational view through another modification.

In Fig. 1 is shown more or less schematically a fender 15 having a wheel access opening 16 closed by a fender shield 17, the assembly embodying the features of the present invention. Having reference, further, to Figs. 2, 4 and 5, the fender shield comprises a panel made from suitable sheet material such as sheet metal which is dimensioned to fit within the wheel access opening 16 and has a reinforcing inwardly extending flange 18 about its top and end margins, the flange being formed generally right angularly to the plane of the fender shield body and having an oblique inner marginal portion 19 extending inwardly generally away from the body panel. This formation of the feeder shield flange is generally complementary to a reinforcing and finishing flange 20 defining the margin of the fender about the wheel access opening 19 and also extending generally inwardly right angularly to the general adjacent plane of the fender and having an inner oblique marginal portion 21. A resilient anti-rattle and sealing gasket strip 22 is carried by the fender shield flange 18, 19 and in assembly is placed under compression between the fender and fender shield flanges.

The construction and arrangement of the fender and fender shield assembly is of the type wherein the fender shield is mounted by an upward movement within the access opening 16 generally in the plane of the fender shield to bring the fender shield and fender flanges 18 and 19, respectively, into general registration. To facilitate such registration and to assure that the outer surface of the fender shield will be flush with the outer surface of the fender, means are provided at the top of the wheel access opening cooperative with the fender and fender shield flanges to serve as guides. To this end, a pair of brackets 23 is carried by the fender to depend downwardly past the flange 20 for engagement inwardly of the fender shield flange portion 19, and a pair of brackets 24 is carried by the upper margin of the fender shield to engage inwardly of the fender flange portion 21. The fender carried brackets 23 serve to hold the upper part of the fender shield against inward displacement whereas the brackets 24 carried by the fender shield serve to retain the upper margin of the fender shield against outward displacement relative to the fender, especially during the initial stages of mounting of the fender shield within the wheel access opening.

In the present instance as shown in Figs. 2 and 3, the fender 15 is equipped with a wheel house structure 25 which is mounted interiorly of the fender above and at the ends of the wheel access opening in generally inward offset relation to the main panel of the fender. An outturned marginal formation 27 on the wheel house is secured to the wheel access opening defining margin of the fender above the flange 20 and forms an inwardly opening groove 28 about the wheel access opening. A closure panel 29 is mounted on the wheel house 25 in closing relation to an opening (not shown) in the wheel house through which access may be had to the fender when it is necessary to iron out dents in the fender. Herein two of the screws identified at 30 by which the closure panel 29 is secured to the wheel house 25 are utilized for attachment of the retaining brackets 23 to the fender.

The brackets 23 may be formed identically, each comprising an elongated finger-like metal strip including a base part 31 which is secured to the fender, an angularly outturned and then diagonally downwardly extending intermediate shoulder portion 32 and a lower fender shield retaining extremity portion 33. As best seen in Fig. 3, the intermediate shoulder portion 32 extends into the wheel house marginal groove 28. The retaining finger extremity 33 is of a length to project downwardly substantially beyond the fender marginal flange extremity portion 21 and in the assembled relationship of the fender shield with the fender provides an edge abutment for the inner marginal fender shield flange portion 19 as encased in the sealing gasket 22. By reason of the angular intermediate shoulder portion 32, the bracket finger 23 is substantially reinforced and will thus adequately resist inward bending stresses that may be exerted thereagainst by the upper margin of the fender shield. Nevertheless, the bracket finger 23 in each instance may be adjustably bent inward or outward as demanded for retaining the fender shield in substantially flush alignment with the fender.

Each of the angular guiding and retaining brackets 24 on the upper fender shield margin preferably comprises an angular generally L-shaped metal member which may be in the form of a stamping having a horizontal leg 34 secured to the underside of the fender shield flange 18, as by spot welding 35 (Figs. 4 and 5). An upstanding leg 37 on the retaining bracket 24 in each instance extends upwardly at the inner side of the fender shield flange portion 19 and projects upwardly substantially therebeyond. In assembling the fender shield with the fender, the upstanding leg portions 37 of the brackets 24 afford convenient placement guide since they are adapted to be engaged behind the fender marginal flange 21 as a preliminary fender shield attachment movement, thereby holding the fender shield against outward displacement until the fender shield has been fully moved up into the mounted relation with the fender and the angular fender shield flange 18, 19 makes full engagement with the fender flange 20, 21 and with the retaining finger brackets 23.

At the lower portion of the ends of the fender shield, and the fender where it defines the wheel access opening 16, are means for supporting the lower portion of the fender shield in assembly with the fender. Herein such means comprise a rear end bracket assembly 38 and a front end latching bracket assembly 39.

The rear end attaching and supporting bracket assembly 38 (Figs. 2, 5 and 7) comprises a bracket plate 40 carried by the fender and a supporting arm 41 interengaged with the bracket 40 and carried by the fender shield. The bracket plate 40 comprises a plate body that has an extension portion 40a at one side by which it is secured to the inner side of the fender marginal flange 20 as by means of screws 42, the major portion of the bracket plate extending inwardly into the wheel space inside of the fender shield and having a vertical slot 43 therein. The upper portion of the slot 43 identified at 44 is preferably relatively wide compared to the lower portion of the slot identified at 45, with the sides of the slot tapering toward the lower portion 45. A reinforcing angular flange 47 is preferably formed along the inner margin of the bracket plate 40. The slot 45 is provided for reception of the retaining arm 41 which is preferably in the form of an elongated bar that may be formed from round bar stock, and the width of the lower slot portion 45 and the diameter of the retaining and supporting arm are preferably generally matched so that the arm is supported fairly closely although not tightly in the bottom of the slot. A flattened base portion 48 on the retaining arm 41 is received against the upper surface of the adjacent end portion of an inturned lower marginal reinforcing and bracket carrying flange 49 on the fender shield, means such as a rivet 50 securing the extremity area of the base portion 48 to the flange 49 while a bolt 51 secures the opposite end section of the base portion to the flange, the flange being provided with a transverse slot 52 to accommodate the bolt, whereby adjustment of the supporting arm in a direction normal to the plane of the fender shield may be effected by loosening the bolt and swinging the arm about the pivot afforded by the attachment rivet 50. From the base portion 48 the arm 40 extends on an offsetting bend section 53 to the main portion of the arm which preferably projects substantially beyond the rear end extremity of the fender shield, being formed at its extremity with a downturned retaining terminal 54.

The latching bracket assembly 39 (Figs. 2, 5 and 6) comprises a supporting bracket plate 55 and a latching arm 57. The bracket plate 55 is formed somewhat like the rear end bracket plate 40 in that it comprises a plate body which has a side extension portion 58 which is secured to the adjacent portion of the fender flange 20 by means such as screws 59. The major portion of the bracket plate 55 extends inwardly into the wheel opening past the fender flange portion 21 and has a vertical retaining arm receiving slot 60.

This slot has an upper enlarged portion 61 which tapers down to a reduced width portion 62 in the bottom of which the arm 57 is received relatively closely but nevertheless loosely enough to be freely movable vertically therein. A reinforcing flange 63 is preferably provided on the inner margin of the plate 55.

The latching arm 57 is preferably formed at its extremity with a downturned retaining terminal 64 and is of a length to project substantially beyond the adjacent front end of the fender shield into the latching engagement with the bracket 55, being provided rearwardly from the end extremity of the fender shield with a journal loop 65 joined to an upstanding reversely turned loop 66 from which extends generally rearwardly a manipulating handle portion 67 formed with an inwardly projecting finger loop 68 and an outwardly projecting upwardly turned latching terminal 69 adapted to engage upon the fender shield flange 49 outwardly of a reinforcing and retaining upwardly extending inner marginal flange 70 on the fender shield flange 49. It will be observed in Figures 2 and 5 that the terminal extremity of the latching terminal portion 69 slants upwardly and inwardly relative to the fender shield panel. Thereby, the terminal extremity of the latching portion 69 provides a cam surface engageable with the inner edge of the fender shield flange 49 and gradually flexes the handle portion 66 inwardly as it is pushed upwardly into latching position. The latching terminal portion 69 then snaps into latching relation over and forwardly of the marginal flange 70.

The journal loop 65 is pivotally engaged about a pivot member 71 carried between upstanding ears 72 on a supporting bracket plate member 73 of elongated form and carried by the upper face of the fender shield flange 49. At its rear end the bracket plate 73 is secured to the fender shield flange by means of a rivet 74, while at its forward end the bracket plate is secured to the fender shield flange by means of a bolt 75 that is accommodated in the fender shield flange through a transverse adjustment slot 77. Thus, the bracket flange 73 is adapted to be adjustably secured in place on the fender shield flange 49 by loosening the bolt 75, determining the particular angle at which the bracket flange 73 most efficiently supports the arm 57 and then tightening the bolt.

In mounting the fender shield 17, the latch arm 57 is disposed in a released position, that is with the handle 67 free from the fender shield flange 49 and extending downwardly, in which position the latch arm 57 extends upwardly within the bounds of the front end of the fender shield. The fender shield is then lifted up into the access opening 16 and the supporting arm 41 is inserted into the upper portion 44 of the receiving slot 43 in the rear bracket 40 carried by the fender. In this operation the fender shield is held with the rear end thereof tilted up while assembly of the arm 41 with the bracket 40 is concentrated upon, the downturned extremity 54 of the attachment arm 41 assuring that the arm will not slip from the slot 43 after the arm has been dropped down to the bottom of the reduced diameter portion 45 of the slot, and while attention is directed to the remainder of the mounting operation.

As a second step in the mounting operation the fender shield is rocked up about the pivot provided by the latch arm 41 engaging with the bracket 40, and in this stage of the mounting operation the upstanding brackets 24 on the fender shield and the downwardly projecting brackets 23 on the fender come into play to assure proper positioning of the upper portion of the fender shield with respect to the upper portion of the access opening.

As a final step in the mounting of the fender shield, the handle 67 is swung up to swing the latch arm 57 downwardly into the latching slot 60 in the bracket 55 and until the latch arm 57 seats within the lower end of the latch slot and by upward pressure on the handle 67 enters into tensioned downwardly pressing engagement with the bracket 55 which exerts an upward tensioning pressure on the fender shield to effect a tensioned, compressed engagement of the gasket 22 between the fender and fender shield marginal flanges. The locking terminal loop portion 69 of the handle is finally sprung over the fender shield marginal flange 70 onto the lower marginal flange 49 and this holds the latch against unintentional release and the fender shield remains in its mounted relation to the fender until the latch is released by again springing the handle out of the interlocked engagement with the fender shield flange 49 and the handle 67 swung downwardly to release the latch arm 57 and thus permit the fender shield to be swung down about its front end until the brackets 23 and 24 are cleared and the rear supporting arm 41 can be withdrawn from the bracket 40 and the fender shield lifted away from the fender. The latch arm 57 and the handle 67 are preferably, of course, formed in one piece from appropriate resilient rod or wire stock.

While proper planar alignment of the lower end portion of the fender shield with the fender is accomplished by appropriate installation adjustment of the supporting arm 41 and the latch arm 57 by means of the respective adjustable mountings thereof on the fender shield flange 49, proper, tight upward engagement of the fender shield in the access opening 16 is preferably assured through the proper installation of the fender carried brackets 40 and 55. For this purpose means are provided to assist in the proper mounting of the fender brackets so that in the final assembly of the fender shield registration of the supporting arm 41 and the latch arm 57 with the respective fender brackets will result in the desired tight mounted interengagement of the fender shield with the fender. To this end, the fender shield marginal flange 18 at the respective opposite end portions of the fender shield is provided with vertically spaced pairs of pilot holes 78 (Fig. 8) which are utilized in the course of installation of the respective fender carried supporting brackets 40 and 55. Thus, as an initial step in installing the fender brackets, the fender shield is placed in mounted relation within the wheel access opening through the aid of the upper marginal retaining brackets 23 and 24 and is held in such position as by securing the upper central portion of the fender shield flange 18 to the fender flange 20 as by means of a C-clamp. Then an appropriate marking tool is inserted successively through the marking holes 78 and the opposing portion of the fender flange 20 marked in registration with the marking holes. The fender shield is then removed by removing the C-clamp and appropriate apertures 79 drilled in the fender flange 20 to receive the respective bracket attaching screws 42 and 59. When the brackets 40 and 55 are then secured to the fender flange 20 proper registration is assured between the brackets and the respective mounting and latching arms to maintain the fender shield in its proper mounted relation with the fender.

Where it is desired to provide means at the top of the fender shield for preliminarily hooking the upper portion of the fender shield onto the fender in the course of mounting the fender shield, one or both of the upper marginal locating brackets, and at least the bracket adjacent the front end of the fender shield may be in the form of bracket 80 shown in Fig. 9. This bracket comprises an upstanding body portion 81 having a lower forwardly extending attachment leg 82 which is secured to the under side of the fender shield marginal flange 18. The body portion 81 extends upwardly substantially above the fender shield marginal extremity flange portion 19 to serve the same function as the brackets 24 described hereinabove. At its upper end the body portion 81 has a forwardly extending flange portion 83 which is shorter than the base or attachment flange portion 82 and has a short downturned extremity 84. Thus the flange 83 and its extremity 84 provide a hook which in the assembled relationship of the fender shield with the fender overlies the upper side of the marginal flange 20, 21 of the fender.

Hence, in the initial stage of assembly of the fender shield with the fender, after the fender shield rear attachment arm has been assembled with the bracket on the fender, the upper margin of the fender shield is located with respect to the fender and the hook portion 83, 84 of the bracket 80 is hooked onto the fender flange 20 substantially as shown in dash outline in Fig. 9. This then entirely relieves the operator for attention to the latch mechanism so that when the latch arm 57 is operated to latch the fender shield in place, and forces the fender shield upwardly into final assembled relation with the fender, the fender shield is moved into the full line position shown in Fig. 9. When the fender shield is to be removed, and the latch is released, the fender shield drops down and is held in suspended relation by the hook formation of the bracket 80.

In those instances where the fender shield is not provided with a wheel housing 25 as shown in Fig. 2, the fender may be provided with bracket members 85 as shown in Fig. 10. For this purpose the bracket 85 comprises a base flange 87 which is attached as by means of a bolt 88 to the fender flange 20. From the base flange 87 extends an intermediate body portion 89 which is formed on a complementary angle to the fender terminal flange 21 and rests thereagainst, and extends therebeyond to an extent sufficient to clear the fender shield marginal flange portion 19 as encased in the sealing gasket 22 whereby a downwardly extending retaining flange 90 on the bracket is engageable by the fender shield flange to locate the fender shield flange properly with respect to the fender in the mounted relation of the fender shield. It will thus be apparent that the bracket 85 provides a substitute for the brackets 23 of Fig. 2.

I claim as my invention:

1. In a fender and fender shield assembly, a fender having a wheel access opening, a fender shield for substantially closing said opening, the fender shield being insertable into the opening by an upward movement generally in its plane and having marginal engagement with the margin of the fender defining said access opening, upstanding brackets on the upper margin of the fender shield engageable back of the adjacent margin of the fender for holding the fender shield against outward displacement as an incident to its mounting, downwardly extending bracket means on the fender engaging behind the fender shield margin to hold the fender shield against rearward displacement, respective brackets on the fender adjacent the lower portions of the ends of the access opening, and supporting arms interengaging supportingly with said brackets, one of said arms comprising a releasable latch cooperating with the opposite arm and said fender brackets to effect upwardly directed compression force in the fender shield to retain the fender shield tightly in the wheel access opening.

2. In combination in a fender and fender shield assembly, a fender having a wheel access opening defined by an inwardly extending marginal flange, a fender shield having an inturned marginal flange generally complementary to and cooperating with the fender marginal flange in the assembled relationship of the fender shield within the wheel access opening, and bracket means comprising elongated finger-like metal strips and carried by the upper margin of the fender defining the wheel access opening and extending downwardly behind said flanges at substantially spaced points and holding the upper portion of the fender shield against inward displacement from the fender.

3. In combination in a fender construction of the character described including a fender body, a wheel house carried by the inside of the fender body, a wheel access opening in the fender, and a plurality of elongated finger-like metal strip brackets carried in spaced relation by the wheel house and extending down at the inside of the upper margin defining the wheel access opening and adapted to engage with the upper margin of a fender shield closing the wheel access opening to hold the fender shield against inward movement out of planar alignment with the fender.

4. In a fender shield construction of the character described, a fender shield panel having an upper inturned flange, and a positioning bracket including a portion secured to the under face of the upper portion of the inturned flange and including a part projecting upwardly behind said flange for engagement with the marginal flange of a fender at the wheel access opening of the latter when positioning the fender shield in the wheel access opening, said upstanding portion of the bracket including a forwardly extending and downwardly opening hook portion for engagement in fender shield suspending relation upon an inturned marginal flange on the fender, said hook portion being spaced a substantial distance above said fender shield flange normally to clear the fender flange and being engageable with the fender flange only when the fender shield flange is in substantially spaced relation below the fender flange.

5. In supporting means for a fender and fender shield assembly, a bracket plate having a vertical slot and adapted to be secured to the inturned flange of a fender defining the wheel access opening thereof, and an arm formed of rod stock arranged to be secured to an inturned flange on a fender shield and having a portion interengageable within said slot, said slot having the upper portion thereof wider than the lower portion thereof to facilitate insertion and guiding of the arm into the bottom of the slot.

6. In supporting means for a fender and fender shield assembly, a bracket plate having a vertical slot and adapted to be secured to the inturned flange of a fender defining the wheel access opening thereof, and an arm of circular cross-section arranged to be secured to an inturned flange on a fender shield and having a portion interengageable within said slot, said slot having the upper portion thereof wider than the lower portion thereof to facilitate insertion and guiding of the arm into the bottom of the slot.

7. In combination in a fender and fender shield assembly of the character described, a fender having a wheel access opening, a fender shield closing said opening, the fender having a bracket thereon extending inwardly at the lower portion of one end of the wheel access opening and having a vertical slot therein, and a latch member carried by the fender shield and having an arm formed of rod stock swingable into and out of said slot, said slot having the upper portion thereof wider than the lower portion thereof to facilitate insertion and guiding of the arm into the bottom of the slot.

8. In combination in fender shield supporting means, a bracket member adapted to be secured to a fender, a supporting arm member of circular cross-section adapted to be carried by a fender shield and engageable with said bracket, said bracket having an elongated slot therein receptive of said arm, said arm having a turned terminal portion interengageable with the bracket after the arm has been inserted within said slot to restrain withdrawl of the arm from the slot, said slot having the upper portion thereof wider than the lower portion thereof to facilitate insertion and guiding of the arm into the bottom of the slot.

9. In combination in a fender and fender shield assembly, a fender shield having an inturned marginal flange, a fender having a wheel access opening closed by the fender shield and having an inturned marginal flange about the wheel access opening generally complementary to the flange on the fender shield, a supporting arm of circular cross-section carried by the fender shield, a bracket having a vertical slot therein and secured to said fender flange by screw means and engageable in said slot by said arm, the fender shield flange having template opening therein by which the screw means for the fender carried bracket is properly located for operative registration of the bracket and the arm.

10. In a fender shield construction, a fender shield panel, latching means attached to said panel, a marginal flange on said fender shield panel, said flange having a template opening therein adapted for locating the point at which a screw hole is to be made in a complementary fender flange, and said template opening being located in such relation to said latching means as to afford proper location of said screw hole for use in attaching mating latching means to a complementary fender flange.

11. In combination in a fender and fender shield assembly, a fender having a wheel access opening therein, a fender shield for closing said opening, said fender and fender shield having respective complementary marginal flange structures interengageable by upward movement of the fender shield in the wheel access opening, means at the respective opposite end portions of the fender shield and the fender at the ends of the wheel access opening interengageable for retaining the lower portion of the fender shield in the assembly and operable to impart an upward thrust of the fender shield in the wheel access opening, a plurality of retaining finger brackets carried by and projecting upwardly from the upper margin of the fender shield past the inner edge of the marginal flange thereof and engageable inwardly of the fender marginal flange to retain the upper portion of the fender shield against outward displacement from the assembly, and a plurality of downwardly extending finger brackets on the fender and extending past the inner edge of the fender marginal flange for engagement at the inner side of the fender shield marginal flange to retain the upper portion of the fender shield against inward displacement, respective ones of the fender carried and fender shield carried finger brackets being disposed in adjacent relation and near respective opposite end portions of the upper portion of the fender shield to afford stability of retention against displacement of the fender shield.

12. In a construction wherein a fender shield having a lower marginal inturned flange is detachably securable in position on a fender, a bracket including means for attaching the same to one end portion of the fender shield lower marginal flange, a torsion latch member having a latching arm arranged to extend beyond the adjacent end of the fender shield for engagement with retaining means on the associated fender, an elongated handle portion on said torsion latch member, integral connecting means in one piece with said arm and handle portion and comprising a return bent journal loop contiguous the arm and a substantially larger reversely bent loop contiguous the handle portion and connected to said journal loop and affording substantial resilience for said handle portion with minimum handle length, and a pivot element pivotally connecting said journal loop to said bracket so that in working said handle portion up and down the arm is swung about the axis of said pivot.

13. In combination in a fender shield construction, a fender shield panel having a lower marginal inturned flange structure, and a latch mechanism carried by said fender shield panel at said lower flange, said mechanism including a supporting bracket and a torsion latch member pivotally mounted on said bracket and including an actuating handle portion of substantial length and operatively disposed for up and down movement alongside the inner edge of said lower flange structure, the distal end portion of said handle portion including a generally outwardly directed latching terminal engageable upon said flange structure, said latching terminal having a cam extremity slanting inwardly and engageable with the inner edge portion of said flange structure to stress the handle portion inwardly as an incident to movement of the handle portion toward the latching engagement of said latching terminal with the flange structure and until in such movement the latching terminal snaps into latching relation with the flange structure.

14. In a fender and fender shield assembly, a fender having a wheel access opening, a fender shield for substantially closing said opening, the fender shield being insertable into the opening by an upward movement generally in its plane and having marginal engagement with the margin of the fender defining said access opening, means at the interengaging margins of the fender and fender shield for retaining the fender shield against displacement transverse to its plane at the upper portion of the fender shield, respective brackets on the fender adjacent to the lower portions of the ends of the access opening, each of said brackets having a vertically elongated slot wider at the top than at the bottom, a supporting arm on a bracket secured to one end portion of the fender shield and with the arm engageable supportingly in the slot of the adjacent fender bracket upon rocking engagement of the fender in its plane to extend the arm into the upper wider portion of the associated slot and then movement of the arm down into the narrower portion of such slot, and a bracket carried by the opposite end portion of the fender shield and having a pivotally mounted swingable latching arm thereon engageable in the slot of the remaining bracket on the fender as a final attachment of the fender shield to the fender by engagement of the swingable latch arm through the wider portion of the slot in the associated bracket and then downwardly into the narrower portion of such slot, thereby to exert upward pressure on the fender shield to drive the margin of the fender shield tightly against the margin of the fender defining the wheel access opening.

15. A fender and fender shield assembly as defined in claim 14 wherein said fender shield carried brackets are adjustable transversely to the plane of the fender shield for properly aligning the plane of the fender shield with the plane of the fender.

GEORGE W. SCHATZMAN.

REFERENCES CITED

The following references are of record in the file of this patent:

UNITED STATES PATENTS

| Number | Name | Date |
|---|---|---|
| Re. 20,857 | Haltenberger | Sept. 13, 1938 |
| 1,998,134 | Gorman et al. | Apr. 16, 1935 |
| 2,017,564 | Claud-Mantle | Oct. 15, 1935 |
| 2,068,732 | Cadwallader | Jan. 26, 1937 |
| 2,115,768 | Haltenberger | May 3, 1938 |
| 2,161,160 | Harroun et al. | June 6, 1939 |
| 2,222,619 | Jandus | Nov. 26, 1940 |
| 2,288,725 | Lyon | July 7, 1942 |
| 2,312,536 | Fergueson | Mar. 2, 1943 |
| 2,404,456 | Pierce | July 23, 1946 |